No. 812,627. PATENTED FEB. 13, 1906.
C. E. WIRTH & W. W. BRADLEY.
GAS REGULATING DEVICE.
APPLICATION FILED NOV. 28, 1904.
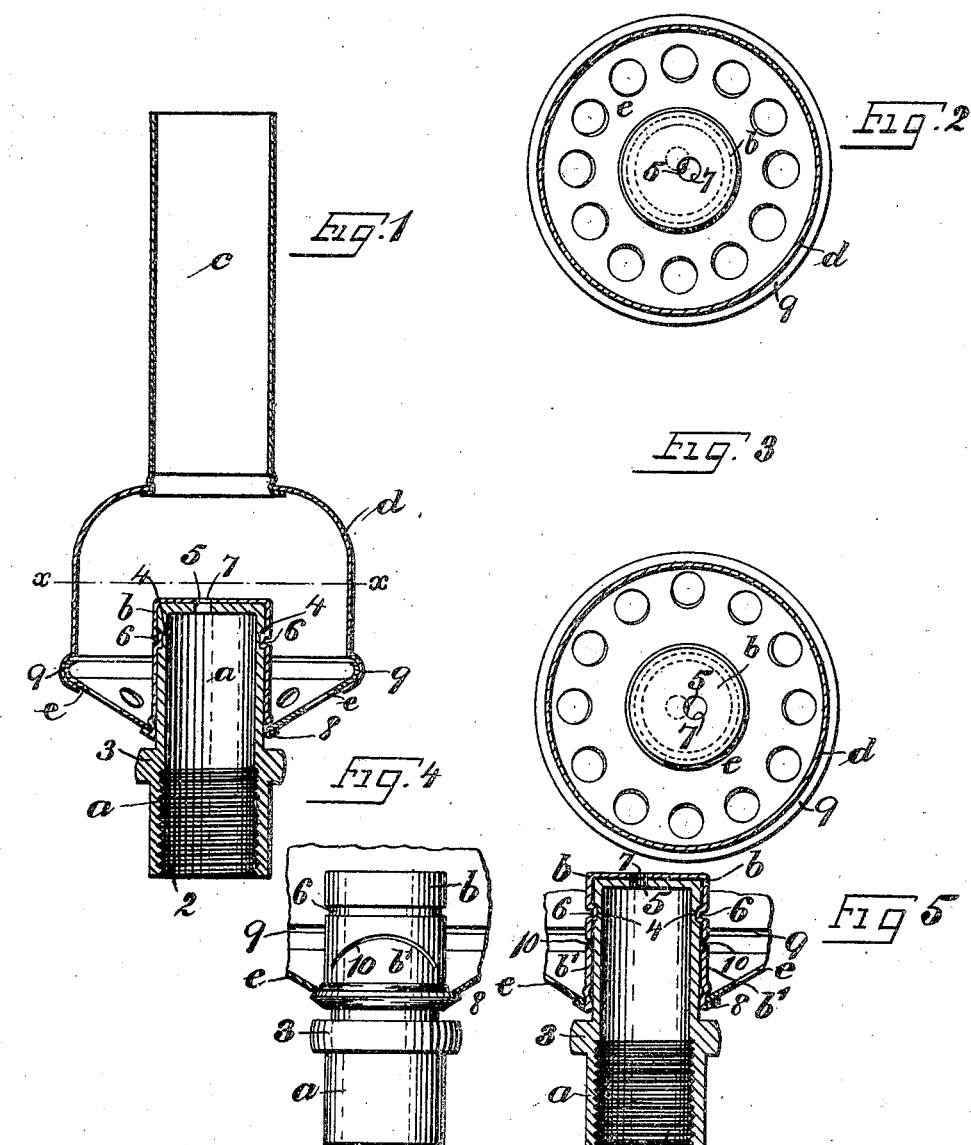
WITNESSES
INVENTORS
Charles E. Wirth
William W. Bradley.
PER Harold Serrell
ATTY

UNITED STATES PATENT OFFICE.

CHARLES E. WIRTH AND WILLIAM W. BRADLEY, OF WATERBURY, CONNECTICUT, ASSIGNORS TO THE PLUME AND ATWOOD MFG. CO., OF WATERBURY, CONNECTICUT, A CORPORATION OF CONNECTICUT.

GAS-REGULATING DEVICE.

No. 812,627.     Specification of Letters Patent.     Patented Feb. 13, 1906.

Application filed November 28, 1904. Serial No. 234,465.

*To all whom it may concern:*

Be it known that we, CHARLES E. WIRTH and WILLIAM W. BRADLEY, citizens of the United States, residing at Waterbury, in the county of New Haven and State of Connecticut, have invented an Improvement in Gas-Regulating Devices, of which the following is a specification.

Our invention relates to certain new and useful improvements in burners of the Bunsen type, especially adapted for use with incandescent or Welsbach mantles; and the object of our invention is to efficiently and quickly regulate the supply of gas either between minimum and maximum quantities or between the closed-off condition and a maximum supply.

Our invention consists of a nipple or member adapted to be connected in a fixed relation to a gas tube or pipe and a part connected thereto and revoluble thereon and including a cap and Bunsen tube with openings or gas-passages in the top of the nipple and top of the cap that are made eccentric to the axial center of the Bunsen tube, so that in one position they will coincide for a full opening and clear passage for the gas, and when the movable member is turned either to one side or the other the openings will gradually lessen either to a minimum aperture, which will remain open for a minimum supply or to an entirely closed-off condition, which will prevent any gas passing through. If the extent of eccentricity off the axial center is sufficient, the opening will be entirely closed, or if sufficiently near the center a minimum size of aperture will always remain open. To insure a gas-tight and suitable connection of the revoluble part upon the nipple or member adapted to be connected in a fixed relation to a gas tube or pipe, we provide a groove on the one part and a rib on the other and means for establishing sufficient friction between the parts so that they will remain in any position to which they may be turned without accidental shifting.

In the drawings, Figure 1 is a vertical section representing one form of device of our improvement. Figs. 2 and 3 are sectional plan views at the line *x x* of Fig. 1. Fig. 4 is an elevation, and Fig. 5 a vertical section at right angles to the position Fig. 4, showing a form of our invention.

The nipple or member *a*, adapted to be connected in a fixed relation to a gas pipe or tube, is at the lower end interiorly threaded at 2 for such attachment. It is preferably provided with a rib 3 with a closed upper end and with a circumferential groove 4 near the closed upper end, in which upper end there is a gas-aperture 5. *b* represents a cap of thinner or sheet metal fitting closely over the exterior of the nipple *a* and provided with a groove 6 in the outer surface, which has a rib in the inner surface fitting the groove 4 of the nipple *a*. These parts are thus connected, axial movement is prevented, a gas-tight joint is established, but a revoluble movement of the one part on the other may be effected. This cap *b* is provided with a gas-aperture 7 and with a base-flange 8.

*c* is the Bunsen tube, *d* a hood connected to the lower end of the Bunsen tube and secured by a circumferential flange 9 to the outer end of the air-distributer *e*, this air-distributer *e* in turn surrounding and being connected to the flange 8 of the cap *b*.

The gas-aperture 5 in the nipple *a* and the gas-aperture 7 in the cap *b* are made eccentric to the axial center of the Bunsen tube, cap, and nipple. Fig. 2 shows a degree of eccentricity which when the apertures are in direct opposition closes off the opening, so as to prevent any escape of gas from the gas-pipe into the hood and Bunsen tube, while Fig. 3 shows a degree or extent of eccentricity off the axial center such as will provide for a minimum aperture when the gas-apertures 5 and 7 are in opposition. This position of opposition is shown in Fig. 3, while in Fig. 2 a minimum aperture substantially equal to the minimum aperture shown in Fig. 3 is shown appreciably before the said gas-apertures come into opposition. It is therefore apparent that in one position of the parts the gas-apertures 5 and 7 coincide for a full opening and clear passage-way for the gas from the gas-pipe into the hood and Bunsen tube to meet the incoming air through the apertures in the air-distributer *e*, so that the air and gas are mixed in the hood and Bunsen tube to be burned at the upper end of the tube *c*.

In Fig. 1 the cap $b$ is made to very closely surround and fit the upper end of the nipple $a$ so closely that there is sufficient friction between the parts in turning to maintain them in any position to which they may be moved; but we do not limit ourselves to such close fit, because according to Figs. 4 and 5 we may provide in one side or in opposite sides of the cap $b$ one or more slots 10, preferably of curved form, so as to provide a tongue $b'$, which can be forced slightly inward to provide the necessary friction and bearing against the exterior of the nipple $a$ where the fit is otherwise, except at the groove 4 of the nipple and rim of the cap, comparatively loose. We prefer in this modified form of our invention to form the slots 10 in opposite sides and to employ the two tongues $b'$ made thereby, as in this manner the pressure and consequent friction is equally divided, the groove 4 of the nipple $a$ and the groove 6 of the cap $b$ in Figs. 4 and 5 being the same and forming the same gas-tight joint as in the form of invention shown in Fig. 1.

We claim as our invention—

1. In a gas-regulating device, a nipple or member adapted to be connected in a fixed relation to a gas tube or pipe and a revoluble cap closely surrounding the same, said parts being each provided in the adjacent top portions with a single opening or gas-passage of appreciable area at one side of the axial center and one wall of each of which openings agrees with the axial center of the nipple for regulating the supply of gas by the eccentric relation of one opening to the other.

2. In a gas-regulating device, a nipple or member adapted to be connected in a fixed relation to a gas tube or pipe and a revoluble cap closely surrounding the same, said parts being each provided in the adjacent top portions with a single opening or gas-passage of appreciable area at one side of the axial center and one wall of each of which openings agrees with the axial center of the nipple for regulating the supply of gas by the eccentric relation of one opening to the other and means for connecting the nipple and revoluble cap to permit a revoluble movement but prevent accidental separation longitudinally.

3. In a gas-regulating device, a nipple or member adapted to be connected in a fixed relation to a gas tube or pipe and a cap surrounding the same, said parts being provided with openings or gas-passages in the top of the nipple and top of the cap that are made eccentric to the axial center of the said nipple and cap, the nipple being provided near its upper end with a circumferential groove and the cap fitting over the same provided with a circumferential groove in the outer surface and consequent rib on the inner surface fitting into the groove of the nipple and so connecting the parts to prevent longitudinal separation but providing for a revoluble movement of the cap upon the nipple and a gas-tight joint, and means adapted to form a frictional contact of the cap upon the nipple, permitting the revoluble movement but preventing accidental shifting of the parts.

4. In a gas-regulating device, a nipple or member adapted to be connected in a fixed relation to a gas tube or pipe and a cap surrounding the same, said parts being provided with openings or gas-passages in the top of the nipple and top of the cap that are made eccentric to the axial center of the said nipple and cap, the nipple being provided near its upper end with a circumferential groove and the cap fitting over the same provided with a circumferential groove in the outer surface and consequent rib on the inner surface fitting into the groove of the nipple and so connecting the parts to prevent longitudinal separation but providing for a revoluble movement of the cap upon the nipple and a gas-tight joint, and one or more tongues provided in the cap by slotting the same so that the tongues bear frictionally against the surface of the nipple.

5. In a gas-regulating device, a nipple or member adapted to be connected in a fixed relation to a gas tube or pipe and a cap surrounding the same, said parts being provided with openings or gas-passages in the top of the nipple and top of the cap, the nipple being provided near its upper end with a circumferential groove and the cap fitting over the same provided with a circumferential groove in the outer surface and consequent rib on the inner surface fitting into the groove of the nipple and so connecting the parts to prevent longitudinal separation but providing for a revoluble movement of the cap upon the nipple and a gas-tight joint.

6. In a gas-regulating device, a nipple or member adapted to be connected in a fixed relation to a gas tube or pipe and a cap surrounding the same, said parts being provided with openings or gas-passages in the top of the nipple and top of the cap, the nipple being provided near its upper end with a circumferential groove and the cap fitting over the same provided with a circumferential groove in the outer surface and consequent rib on the inner surface fitting into the groove of the nipple and so connecting the parts to prevent longitudinal separation but providing for a revoluble movement of the cap upon the nipple and a gas-tight joint, and one or more tongues provided in the cap by slotting the same so that the tongues bear frictionally against the surface of the nipple.

7. In a gas-regulating device, a nipple or member adapted to be connected in a fixed relation to a gas tube or pipe and a revoluble cap closely surrounding the same, said parts being provided in the top portions with openings of appreciable area, one of said openings being at one side of the axial center, for regulating the supply of gas by the eccentric relation of one opening to the other, and means for connecting the nipple and revoluble cap to permit a revoluble movement but prevent accidental separation longitudinally.

8. In a gas-regulating device, a nipple or member adapted to be connected in a fixed relation to a gas tube or pipe and a cap surrounding the same, said parts being provided with openings in the top portions, one of said openings being eccentric to the axial center of the said nipple and cap, the nipple being provided near its upper end with a circumferential groove and the cap fitting over the same provided with a circumferential groove in the outer surface and consequent rib on the inner surface fitting into the groove of the nipple and so connecting the parts to prevent longitudinal separation but providing for a revoluble movement of the cap upon the nipple and a gas-tight joint.

9. A gas-regulating device comprising a Bunsen tube, a hood, an air-distributer and a cap connected together and forming a unitary revoluble member, a nipple or member received at one end within the cap and at its other end interiorly threaded and adapted to be screwed upon the upper end of a gas tube or pipe into a fixed relation therewith, said nipple being closed at its upper end adjacent to the top of the cap, said nipple and said cap being provided with openings one of which is made eccentric to the axial center of the Bunsen tube, cap and nipple.

10. A gas-regulating device, comprising a Bunsen tube, a hood, an air-distributer and a cap connected together and forming a unitary revoluble member, a nipple or member received at one end within the cap and at its other end interiorly threaded and adapted to be screwed upon the upper end of a gas tube or pipe into a fixed relation therewith, said nipple being closed at its upper end adjacent to the top of the cap, said nipple and said cap being provided with openings one of which is made eccentric to the axial center of the Bunsen tube, cap and nipple, and means for connecting the cap and nipple so as to provide a gas-tight joint to prevent longitudinal movement but provide for the revoluble movement.

Signed by us this 22d day of November, 1904.

CHAS. E. WIRTH.
W. W. BRADLEY.

Witnesses:
J. L. SCOTT,
B. L. NETTLETON.